US012527820B2

(12) United States Patent
Temnik et al.

(10) Patent No.: US 12,527,820 B2
(45) Date of Patent: *Jan. 20, 2026

(54) PHARMACEUTICAL COMPOSITION AND METHOD FOR SUPPRESSING DEGENERATION

(71) Applicant: Vector Vitale IP LLC, North Miami Beach, FL (US)

(72) Inventors: Max Temnik, Miami, FL (US); Sergey Gurin, Richmond, VA (US); Oleksandr Balakin, Dnepropetrovsk (UA); Peter Novak, Sunny Isles Beach, FL (US)

(73) Assignee: Vector Vitale IP LLC, North Miami Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/677,521

(22) Filed: May 29, 2024

(65) Prior Publication Data

US 2024/0316097 A1 Sep. 26, 2024

Related U.S. Application Data

(63) Continuation-in-part of application No. 17/969,266, filed on Oct. 19, 2022, now Pat. No. 12,011,458, which is a continuation of application No. 17/113,904, filed on Dec. 7, 2020, now Pat. No. 11,484,550, which is a continuation of application No. 16/236,343, filed on Dec. 29, 2018, now Pat. No. 10,857,180, which is a continuation of application No. 15/613,109, filed on Jun. 2, 2017, now Pat. No. 10,226,484, which is a continuation-in-part of application No. 14/833,114, filed on Aug. 23, 2015, now Pat. No. 9,861,659.

(60) Provisional application No. 62/123,900, filed on Dec. 1, 2014.

(51) Int. Cl.
*A61K 33/30* (2006.01)
*A23L 33/10* (2016.01)
*A23L 33/16* (2016.01)
*A61K 31/704* (2006.01)
*A61K 33/00* (2006.01)
*A61K 33/06* (2006.01)
*A61K 45/06* (2006.01)

(52) U.S. Cl.
CPC .............. *A61K 33/30* (2013.01); *A23L 33/10* (2016.08); *A23L 33/16* (2016.08); *A61K 31/704* (2013.01); *A61K 33/00* (2013.01); *A61K 33/06* (2013.01); *A61K 45/06* (2013.01)

(58) Field of Classification Search
CPC ........ A61K 33/24; A61K 33/30; A61K 33/00; A61K 45/06
See application file for complete search history.

(56) References Cited

U.S. PATENT DOCUMENTS

| | | |
|---|---|---|
| 4,068,122 A | 1/1978 | Schmidt et al. |
| 5,912,178 A | 6/1999 | Porter et al. |
| 6,656,127 B1 | 12/2003 | Ben-Oren et al. |
| 6,838,020 B2 | 1/2005 | Kelsey |
| 7,473,892 B2 | 1/2009 | Sano et al. |
| 8,512,258 B2 | 8/2013 | Ben Oren et al. |
| 8,512,676 B1 | 8/2013 | Eghbalnia et al. |
| 8,753,889 B1 | 6/2014 | Roeder |
| 9,518,972 B2 | 12/2016 | Joseph et al. |
| 9,861,659 B2 | 1/2018 | Novak et al. |
| 10,183,041 B2 | 1/2019 | Novak et al. |
| 10,226,484 B2 | 3/2019 | Novak et al. |
| 10,857,180 B2 | 12/2020 | Novak et al. |
| 11,484,550 B2 | 11/2022 | Novak et al. |
| 12,011,458 B2 | 6/2024 | Novak et al. |
| 2003/0068351 A1 | 4/2003 | Roig |
| 2003/0118713 A1 | 6/2003 | Bjorkstrom et al. |
| 2003/0211132 A1 | 11/2003 | Ohkawa |
| 2004/0013732 A1 | 1/2004 | Farber et al. |
| 2004/0234450 A1 | 11/2004 | Howes |
| 2007/0102635 A1* | 5/2007 | Ma ............... G01N 21/6428 250/338.1 |
| 2007/0111314 A1* | 5/2007 | Lin ................ G01N 33/26 436/27 |
| 2007/0123791 A1 | 5/2007 | Assadi-porter et al. |
| 2007/0207191 A1 | 9/2007 | Kanzer et al. |
| 2009/0042304 A1 | 2/2009 | Anderson et al. |

(Continued)

FOREIGN PATENT DOCUMENTS

| | | |
|---|---|---|
| CN | 106854147 A | 6/2017 |
| GB | 2531207 A | 4/2016 |

(Continued)

OTHER PUBLICATIONS

Weiss et al., "Isotopic Discrimination of Zinc in Higher Plants," New Phytologist, 2005, pp. 703-710.
Sorrequieta et al., "Free Amino Acid Production During Tomato Fruit Ripening a Focus on L-Glutamate, Amino Acids," 2010, pp. 1523-1532.
Giovannucci, "Tomatoes, Tomato-Based Products, Lycopene, and Cancer: Review of the Epidemiologic Literature," J. National Cancer Institute, 1999, 91(4), pp. 317-331.
Palm et al., "Identification and Relative Ratios of Cations and Anions in Orange Juice, Banana, Soft Drink, and Various Mineral Tablets," Undergraduate Chemistry Research, 2010, 9(2), 69-74.
Merriam-Webster: Intragastric, 1 pg.
Albarede, "Medical applications of the Cu, Zn, and S Isotope effects," Metallomics, Jul. 25, 2016, pp. 1056-1070.

(Continued)

*Primary Examiner* — Kyle A Purdy
(74) *Attorney, Agent, or Firm* — Liang & Hennessey LLP; Stanley D. Liang

(57) ABSTRACT

A pharmaceutical composition is used for improving health, curing abnormalities and degenerative diseases, and achieving anti-aging therapeutic effect in mammals. The pharmaceutical composition includes a pharmaceutical carrier and an isotope selective component including at least one of a chemical element in which the isotopic ratio of at least one light isotope is altered to exceed natural abundance.

3 Claims, No Drawings

(56) References Cited

U.S. PATENT DOCUMENTS

| | | |
|---|---|---|
| 2010/0183736 A1 | 7/2010 | Hays |
| 2010/0240089 A1 | 9/2010 | Inskip et al. |
| 2011/0031391 A1 | 2/2011 | Beecher |
| 2012/0021526 A1 | 1/2012 | Baer et al. |
| 2013/0101505 A1 | 4/2013 | Di Pasqua et al. |
| 2013/0115650 A1 | 5/2013 | Anbar et al. |
| 2014/0033795 A1 | 2/2014 | Guggenheim et al. |
| 2014/0051116 A1 | 2/2014 | Tea et al. |
| 2014/0219961 A1 | 8/2014 | Jung et al. |
| 2016/0151415 A1 | 6/2016 | Novak et al. |
| 2016/0153957 A1 | 6/2016 | Novak et al. |
| 2018/0055879 A1 | 3/2018 | Novak et al. |

FOREIGN PATENT DOCUMENTS

| | | |
|---|---|---|
| JP | S57156329 A | 9/1982 |
| JP | S6163619 U | 4/1986 |
| RU | 2101982 C1 | 1/1998 |
| RU | 2498807 C1 | 11/2013 |
| UA | 83809 U | 9/2013 |
| WO | 0182871 A2 | 11/2001 |
| WO | 2006072054 A1 | 7/2006 |
| WO | 2010068130 A1 | 6/2010 |

OTHER PUBLICATIONS

CRC Handbook of Chemistry and Physics (49th ed. 1968), pp. 1-3.
IRMM, Institute for Reference Materials and Measurements: Certificate (Zinc isotopes), Jul. 2007, pp. 1-2.
Jefferson Lab: "It's Elemental", Zinc isotopes, Science Education, May 2017, pp. 1-3.
"Yoshida, Leaching of zinc oxide in acidic solution," Materials Trans. 44: pp. 2489-2493 (2003).
U.S. Appl. No. 15/486,026 (Novak) Notice of Allowance (Sep. 18, 2018) incl. Examiner's Amendment.
U.S. Appl. No. 15/486,026 (Novak) Interview Summary & Refs. Cited (Sep. 18, 2018).
U.S. Appl. No. 15/486,026 (Novak) Terminal Disclaimer & Approval (Sep. 7, 2018).
U.S. Appl. No. 16/722,249, filed Dec. 20, 2019, not yet published.
U.S. Appl. No. 16/722,295, filed Dec. 20, 2019, not yet published.
U.S. Appl. No. 15/486,026, filed Apr. 12, 2017 (Novak), Office Action dated Apr. 17, 2018.
Florez et al., Isotope ratio mapping by means of laser ablation-single collector-ICP-mass spectrometry: Zn tracer studies in thin sections of Daphnia magna, J. Anal. At. Spectrom. 28: 1005 (2013).
U.S. Appl. No. 15/613, 109 (Novak) Notice of Allowance (Oct. 22, 2018).
U.S. Appl. No. 15/613,109 (Novak), Office Action dated Jun. 6, 2018.
U.S. Appl. No. 15/613,109 (Novak), Office Action dated Jan. 31, 2018.
USDA, "Orange Report," 2016 2 pages.
Jerome Rosenberg, "Theory and Problems of College Chemistry," McGrawhill Book Company, 1980, pp. 1-5.
U.S. Department of Energy "Products and Services Catalog," 2016, pp. 1-10.
U.S. Appl. No. 14/833,114 (Novak) Notice of Allowance (Jun. 27, 2017).
U.S. Appl. No. 14/833,114 (Novak), Office Action dated Dec. 20, 2016.
U.S. Appl. No. 14/833,114 (Novak), Office Action dated Aug. 8, 2016.
Fosset et al., "A Non-Radioactive Method for Measuring Cu Uptake in HepG2 Cells," J. Inorg. Biochem. 99, 1018-1022, 2005.
M.S. Iqbal et al., "Antibacterial Activity of Copper-Amino Acid Complexes," J. Pak. Med. Assoc. 40.9, 1990.
Navarrete et al., "Cooper Isotope Fractionation During Surface Adsorption and Intracellular Incorporation by Bacteria," Geochim, Cosmochim, Acta 75: pp. 784-799, 2011.
Anacona et al., "Synthesis and Antibacterial Activity of Cefriaxone Metal Complexes," Transition Metal Chem. 30:, pp. 897-901, 2005.
Milk Facts, 2006, http://www.milkfacts.info/Nutrition%20Facts/Nutrient%20Content.htm, 10 pgs.
Turnlund et al., "Long-term High Copper Intake: Effects on Copper Absorption, Retention, and Homeostasis in Men," American Society for Clinical, 2005, 822-828.

* cited by examiner

PHARMACEUTICAL COMPOSITION AND METHOD FOR SUPPRESSING DEGENERATION

TECHNICAL FIELD

This disclosure relates to a pharmaceutical composition for treating and preventing degenerative diseases and achieving anti-aging effect in mammals.

BACKGROUND

Degenerative diseases, also known as degenerative disorders, refer to conditions that result from the progressive deterioration of cells or tissues within the body, leading to functional impairments or the loss of specific abilities. These diseases can affect various parts of the body, including the nervous system, musculoskeletal system, and cardiovascular system, among others.

Disease pathogenesis is a complex process influenced by a myriad of factors central to which is metallome—the body's complete set of metals and metalloid species. An unhealthy metallome, marked by a shift of isotopic ratios in favor of heavy isotopes, can lead to significant health issues, including neurodegeneration. Heavy isotopes, when present in higher concentrations, can disrupt cellular functions and contribute to local and systemic inflammation and oxidative stress—two well-known harbingers of neuron death. Unhealthy aging, coupled with exposure to dietary and environmental hazards, can exacerbate the imbalance of metal isotopes, which becomes a driving force in the progress of pathology.

Cancer is one of the degenerative diseases. It is characterized primarily by an increase in the number of abnormal cells derived from a given normal tissue, invasion of adjacent tissues by these abnormal cells, or lymphatic or blood-borne spread of malignant cells to regional lymph nodes and to distant sites (metastasis). Clinical data and molecular biologic studies indicate that cancer is a multistep process that begins with minor preneoplastic changes, which may under certain conditions progress to neoplasia. The neoplastic lesion may evolve clonally and develop an increasing capacity for invasion, growth, metastasis, and heterogeneity, especially under conditions in which the neoplastic cells escape the host's immune surveillance. There is an enormous variety of cancers which are described in detail in medical literature. Examples include cancer of the lung, colon, rectum, prostate, breast, brain, and intestine.

Degenerative diseases pose significant challenges due to their progressive nature and the lack of curative treatments.

This disclosure focuses on the metals' properties within cells, tissues, and organs, and proposes novel mechanisms of action related to functional proteomics, metabonomics, and structural genomics. Unlike conventional medications that typically interact with their targets on a surface level, thereby managing symptoms rather than the root cause, the disclosed pharmaceutical composition uses a multi-omic approach allowing to holistically influence critical biological processes, ranging from protein synthesis and DNA repair to mitochondrial function.

SUMMARY

This disclosure provides a composition combining two active components: at least one enriched stable isotope of a chemical element and an enriched water.

More specifically, this disclosure provides a pharmaceutical composition for suppressing biological degeneration and achieving anti-aging effects in mammals. The pharmaceutical composition includes a first biologically active component including at least one chemical element in which the isotopic ratio is altered to exceed its natural relative mass abundance. The selected isotopes include at least one of $^{24}Mg$, $^{26}Mg$, $^{64}Zn$, $^{66}Zn$, $^{85}Rb$, $^{107}Ag$, $^{130}Ba$, $^{132}Ba$, $^{28}Si$, $^{29}Si$, $^{32}S$, $^{33}S$, $^{79}Br$, and combinations thereof. The second biologically active component includes at least one of a deuterium-depleted water, ionized water, or ozonated water.

This disclosure provides a method of suppressing degeneration by administering a therapeutically or prophylactically effective amount of the disclosed composition to a subject.

DETAILED DESCRIPTION

As used herein, the word "a" or "plurality" before a noun represents one or more of the particular noun.

For the terms "for example" and "such as," and grammatical equivalences thereof, the phrase "and without limitation" is understood to follow unless explicitly stated otherwise. As used herein, the term "about" is meant to account for variations due to experimental error. All measurements reported herein are understood to be modified by the term "about," whether or not the term is explicitly used, unless explicitly stated otherwise. As used herein, the singular forms "a," "an," and "the" include plural referents unless the context clearly dictates otherwise.

All ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" or "5 to 10" or "5-10" should be considered to include the end points 5 and 10.

It is further to be understood that the feature or features of one embodiment may generally be applied to other embodiments, even though not specifically described or illustrated in such other embodiments, unless expressly prohibited by this disclosure or the nature of the relevant embodiments. Likewise, compositions and methods described herein can include any combination of features and/or steps described herein not inconsistent with the objectives of the present disclosure. Numerous modifications and/or adaptations of the compositions and methods described herein will be readily apparent to those skilled in the art without departing from the present subject matter.

Unless otherwise defined, all technical and scientific terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

The term "isotope," as used herein, refers to a variant of a particular chemical element which are rather similar in their physical and chemical properties but have a different atomic mass. According to the proton-neutron model developed by D. I. Ivanenko and W. Heisenberg (1932), atoms of all chemical elements consist of three types of elementary particles: positively charged protons, negatively charged electrons, and neutrons that have no charge. The number of protons p in the nucleus determines the atomic number Z of the chemical element in Mendeleev's periodic table. The proton and the neutron, which have a common name—nucleons—have almost identical weight. The mass of the neutron (1.00866 amu) is somewhat greater than the proton mass (1.00727 amu). The electron mass is much smaller than that of the nucleons (for example, the proton-to-electron mass ratio is 1836.13). Therefore, the mass of the atom is concentrated in its nucleus. Hence, the mass number of the atom A is connected with the atomic number by a simple relation $A=p+n=Z+n$, where n is the number of neutrons in the nucleus of an atom. The number of protons in the nucleus of an atom uniquely determines the position of an element in the periodic table of the elements. Furthermore, the number of protons determines the number of electrons present in a neutral atom thus determining the chemical properties of this atom. However, atoms with the same atomic number Z (and hence the number of protons p) may have different neutron numbers n. Thus atoms with different atomic mass numbers may occupy the same position on the periodic table. Chemical elements having the same atomic number but a different atomic mass are known as isotopes.

As used herein, the terms "isotope" and "stable isotope" refers to a variant of a chemical element that has the same number of protons but a different number of neutrons in its nucleus, resulting in a different atomic mass. Unlike radioactive isotopes, stable isotopes do not undergo radioactive decay and remain unchanged over time. Examples include $^{64}Zn$, $^{85}Rb$, and $^{28}Mg$.

The "natural abundance" of an isotope refers to the fraction of the total amount of the corresponding element that the isotope represents, on a mole-fraction basis (that is, not, for example, on a mass basis). For example, if $^{64}Zn$ had an earth natural abundance of 48.63%, that would mean that 48.63% of Zn atoms on earth are the isotope $^{64}Zn$. When a composition is "enriched" for a certain isotope, the abundance of the isotope in the composition is greater than the isotope's natural abundance. For the preceding $^{64}Zn$ example, a composition in which $^{64}Zn$ constitutes more than 48.63% of the total Zn in the composition, on a mole-fraction basis, would be "enriched" for $^{64}Zn$. Throughout the claims of this application, a subscript "e" following a light isotope chemical symbol or element name indicates that the designated element is enriched for that isotope. For example, $^{64}Zn$ refers to the light isotope zinc-64, whereas $^{64}Zn_e$ refers to zinc that is enriched for zinc-$^{64}$. Thus, "$^{64}Zn_e$ aspartate," for example, refers to zinc aspartate in which the zinc atoms are enriched for zinc-64.

As used herein, the terms "treat," "treating," "treatment of" a condition encompass performing an act (such as administering the disclosed composition) in order to cure, eradicate, or diminish the severity of, the condition treated. These terms thus encompass accomplishing any one or more of curing, eradicating, and diminishing the severity of the condition treated.

As used herein, the terms "prevent," "preventing," "prevention of" a condition encompass performing an act (such as administering the composition of the invention) in order to prevent the occurrence of the condition and diminish the severity of the condition if it occurs subsequent to the act. These terms thus encompass accomplishing any one or more of wholly preventing the condition from occurring and diminishing the severity of the condition if it occurs subsequent to the act.

As used herein, the term "suppression," "suppress," and the like of a condition encompass performing an act (such as administering the disclosed composition) to curb, inhibit, or even stop a condition, such as degeneration, a degenerative disease, and the like.

"Effective amount," "prophylactically effective amount," or "therapeutically effective amount" refers to an amount of an agent or composition that provides a beneficial effect or favorable result to a subject, or alternatively, an amount of an agent or composition that exhibits the desired in vivo or in vitro activity.

"Effective amount," "prophylactically effective amount," or "therapeutically effective amount" refers to an amount of an agent or composition that provides the desired biological, therapeutic, and/or prophylactic result. That result can be reduction, amelioration, palliation, lessening, delaying, and/or alleviation of one or more of the signs, symptoms, or causes of a disease, disorder or condition in a patient/subject, or any other desired alteration of a biological system. An effective amount can be administered in one or more administrations.

An "effective amount," "prophylactically effective amount," or "therapeutically effective amount" may be first estimated either in accordance with cell culture assays or using animal models, typically mice, rats, guinea pigs, rabbits, dogs or pigs. An animal model may be used to determine an appropriate concentration range and route of administration. Such information can then be used to determine appropriate doses and routes of administration for humans. When calculating a human equivalent dose, a conversion table such as that provided in Guidance for Industry: Estimating the Maximum Safe Starting Dose in Initial Clinical Trials for Therapeutics in Adult Healthy Volunteers (U.S. Department of Health and Human Services, Food and Drug Administration, Center for Drug Evaluation and Research (CDER), July 2005) may be used. The person of ordinary skill in the art is aware of additional guidance that may also be used to develop human therapeutic dosages based on non-human data. An effective dose is generally 0.01 mg/kg to 2000 mg/kg of an active agent, preferably 0.05 mg/kg to 500 mg/kg of an active agent. An exact effective dose will depend on the severity of the disease, patient's general state of health, age, body weight and sex, nutrition, time and frequency of administration, combination(s) of medicines, response sensitivity and tolerance/response to administration and other factors that will be taken into account by a person skilled in the art when determining the dosage and route of administration for a particular patient based on his/her knowledge of the art. Such dose may be determined by conducting routine experiments and at the physician's discretion. Effective doses will also vary depending on the possibility of their combined use with other therapeutic procedures, such as the use of other agents.

As used herein, a "patient" and a "subject" are interchangeable terms and may refer to a human patient/subject, a dog, a cat, a non-human primate, a non-human mammal.

Table 1 shows the natural isotopic abundances, on a mole-fraction basis, of the above-listed isotopes.

TABLE 1

| Isotope | Natural abundance (%) |
|---|---|
| $^{26}$Mg | 11.01 |
| $^{24}$Mg | 78.99 |
| $^{64}$Zn | 48.63 |
| $^{66}$Zn | 27.9 |
| $^{85}$Rb | 72.17 |
| $^{28}$Si | 92.2297 |
| $^{29}$Si | 4.67 |
| $^{130}$Ba | 0.11 |
| $^{132}$Ba | 0.10 |
| $^{52}$Cr | 83.789 |
| $^{58}$Ni | 68.0769 |
| $^{107}$Ag | 14.84 |
| $^{79}$Br | 50.69 |
| $^{32}$S | 95.02 |
| $^{33}$S | 0.76 |

Degenerative diseases are a group of disorders characterized by the progressive deterioration of cells, tissues, or organs over time. These diseases can affect various biological systems in the body, including the nervous system, musculoskeletal system and connective tissues, and various organs, including kidneys, liver, and heart.

The underlying mechanisms often involve complex interactions between genetic, environmental, and lifestyle factors.

The art is replete with various compositions and methods for treating cancer, an example of a degenerative disease. But cancer remains a huge health problem.

It has been demonstrated by a large number of studies that the isotopic composition of tissues and organs can serve as a diagnostic marker. In particular, the study of the ratios of Cu and Zn isotopes in blood showed their promising interrelationships with age, sex, and pathologies. For example, an estimate of the ratio of Cu isotopes in blood serum is a new approach to the diagnosis and prognosis of the development of cirrhosis (M. Costas-Rodriguez, Y. Anoshkina, S. Lauwens, H. Van Vlierberghe, J. Isotopic analysis of Cu in blood serum by multi-collector ICP-mass spectrometry: a new approach for the diagnosis and prognosis of liver cirrhosis, Metallomics 2015, 7. 491-498), and the isotopic composition of Zn in breast tissues enables diagnosis of cancer (F. Larner, L. N. Woodley, S. Shousha, A. Moyes, E. Humphreys-Williams, S. Strekopytov, A. N. Halliday, M. Rehkamper, R. C. Coombes, Zinc isotopic compositions of breast cancer tissue, Metallomics 2015, 7. 107-112).

WO2001082871 discloses a method for therapy and diagnosis of colon cancer using a composition based on zinc isotopes having a short half-life, 62Zn in particular, selected from the group consisting of zinc acetate, zinc chloride, and zinc sulfate, to induce apoptosis in the tumor cells of the large intestine. As it is demonstrated therein, the composition containing $^{62}$Zn at a concentration of 60 to 80 μM, in the presence of phosphate binder, induces apoptosis in colon cancer cells. However, the data presented in the said publication relate only to the in vitro experiments on HT-29 cell lines (ATCC cell line number HTB 38) and T-84 (ATCC cell line number CCL 248) derived from a human colon tumor.

Another known method for inhibiting a malignant process is the employment of compositions comprising nanoparticles of porphyrinfulfullerenes (NP) containing such isotopes as $^{25}$Mg and $^{67}$Zn (25 Mg-NP and 67Zn-NP) (Orlova, M. A.; Osipova, E. Yu.; Rumyantsev, S. A.; Ashurko, S. P. Effect of the 67Zn isotope on leukemic cells and normal lymphocytes.—Russian Chemical Bulletin (2012), 61 (2), 405-408). When using the described method and compositions, significant differences in the cytotoxic effect of magnetic and nonmagnetic zinc isotopes on tumor cells were observed, as well as the lack of effect of the complex of magnetic magnesium isotope and primary nanoparticles on such cells. $^{67}$Zn-NP showed potent cytotoxic activity against cells of acute B-lymphoblastic leukemia with LD50 almost three times lower than in healthy donors and four times lower than when using Zn-NP.

However, the compositions and methods described in the prior art documents mentioned above, differ from the claimed ones by the zinc isotope used, diseases that can be treated with it, and additional active ingredients that provide an inhibitory effect on tumors that cause ascites.

This disclosure relates to suppressing degenerative decline. This disclosure provides compositions and methods in response to a degenerative decline. The disclosed composition and method suppress degeneration in a subject by administering one or more of the stated stable isotopes of the elements enriched (relative to its natural abundance) with a corresponding "light isotope," specifically, $^{24}$Mg, $^{26}$Mg, $^{64}$Zn, $^{66}$Zn, $^{85}$Rb, $^{107}$Ag, $^{130}$Ba, $^{132}$Ba, $^{28}$Si, $^{29}$Si, $^{32}$S, $^{33}$S, $^{79}$Br, and combinations thereof to a patient (human or non-human animal), which may alter the chirality of the autocatalytic products present in the patient, resulting in an improvement in the patient's health. Further, the quantity of light isotope that is effective may be proportional to the quantity of the corresponding element that is present in the body. Where the body contains a relatively large quantity of the element, a correspondingly relatively large percentile of the element's light isotope is required to provide an effective dosage amount.

In one aspect, this disclosure provides a therapeutic composition including a first biologically active component including at least one isotope selected from $^{24}$Mg, $^{26}$Mg, $^{64}$Zn, $^{66}$Zn, $^{85}$Rb, $^{107}$Ag, $^{130}$Ba, $^{132}$Ba, $^{28}$Si, $^{29}$Si, $^{32}$S, $^{33}$S, $^{79}$Br present as an element or in the form of a pharmaceutically acceptable salt, compound or complex thereof. In some embodiments, $^{24}$Mg is enriched to exceed 95%, $^{26}$Mg is enriched to exceed 90%, $^{64}$Zn is enriched to exceed 96%, $^{66}$Zn is enriched to exceed 96%, $^{85}$Rb is enriched to exceed 90%, 107Ag is enriched to exceed 62%, $^{130}$Ba is enriched to exceed 10%, $^{132}$Ba is enriched to exceed 10%, 28Si is enriched to exceed 95%, $^{29}$Si is enriched to exceed 95%, $^{32}$S is enriched to exceed 95%, $^{33}$S is enriched to exceed 5%, and/or $^{79}$Br is enriched to exceed 51%. In certain embodiments, the disclosed composition includes a second biologically active component including deuterium depleted water. In some embodiments, the content of deuterium-depleted water ranges from 50 ppm to 150 ppm.

Stable isotopes of a chemical element are non-radioactive forms of elements that have a balanced number of protons and neutrons in their nuclei, which allows them to exist indefinitely without undergoing radioactive decay. Each element can have one or more stable isotopes, and these isotopes are crucial for various medical applications due to their unique properties. Stable isotopes have the same number of protons but differ in the number of neutrons, which gives them slightly different properties.

Deuterium-depleted water is water that has a lower concentration of deuterium compared to the natural levels found in typical water sources. Deuterium ($^2$H) is a stable isotope of hydrogen, often referred to as heavy hydrogen, which has one neutron in addition to the usual single proton found in the hydrogen nucleus. In standard water, deuterium occurs at a concentration of about 150 to 160 parts per million (ppm), meaning it is relatively rare. Deuterium-depleted water is produced through various methods such as distillation, electrolysis, and other chemical processes that remove deuterium from water. The use of deuterium-depleted water in medicine is based on the hypothesis that reducing deuterium levels in the body can influence cellular processes and potentially inhibit the growth and proliferation of cancer cells.

This disclosure provides a method of suppressing degeneration in a subject in need thereof comprising administering a therapeutically effective or prophylactically effective amount of a disclosed composition to the subject.

The disclosed composition may be administered to a subject in need thereof by any suitable mode of administration, any suitable frequency, and at any suitable, effective dosage.

The disclosed composition may be in any suitable form and may be formulated for any suitable means of delivery. In some embodiments, the composition for use in a disclosed method is provided in a form suitable for oral administration, such as a capsule, liquid suspension, liquid solution, or any other conventional oral dosage form. The oral dosage forms may provide immediate release, delayed release, sustained release, or enteric release, and, if appropriate, comprise one or more coating. In some other embodiments, the disclosed composition is provided in a form suitable for injection, such as subcutaneous, intramuscular, intravenous, intraperitoneal, or any other route of injection. In some embodiments, compositions for injection are provided in sterile and/or non-pyrogenic form and may contain sodium phosphate dibasic heptahydrate or other suitable buffer, a pH-adjusting agent such as hydrochloric acid or sodium hydroxide, and polysorbate 80 or other suitable detergent.

When provided in solution form, in some embodiments, the disclosed composition is provided in a glass or plastic bottle, vial or ampoule, any of which may be suitable for either single or multiple use. The bottle, vial or ampoule containing the disclosed composition may be provided in kit form together with one or more needles of suitable gauge and/or one or more syringes, all of which preferably are sterile. Thus, in certain embodiments, a kit is provided comprising a liquid solution as described above, which is packaged in a suitable glass or plastic bottle, vial or ampoule and may further comprising one or more needles and/or one or more syringes. The kit may further comprise instruction for use.

The disclosed composition can be produced by methods employed in accordance with general practice in the pharmaceutical industry, such as, for example, the methods illustrated in Remington: The Science and Practice of Pharmacy (Pharmaceutical Press; 21st revised ed. (2011) (hereinafter "Remington").

In some embodiments, the disclosed composition includes at least one pharmaceutically acceptable vehicle or carrier. These include, for example, diluents, fillers, disintegrants, solubilizing agents, dispersing agents, preservatives, wetting agents, stabilizers, buffering agents (e.g. phosphate, citrate, acetate, tartrate), suspending agents, emulsifiers, and penetration enhancing agents such as DMSO, as appropriate. The composition can also comprise suitable auxiliary substances, for example, solubilizing agents, dispersing agents, suspending agents and emulsifiers.

In certain embodiments, the composition further comprises suitable diluents, glidants, lubricants, acidulants, stabilizers, fillers, binders, plasticizers or release aids and other pharmaceutically acceptable excipients.

In some embodiments, the disclosed composition can be administered intragastrically, orally, intravenously, intraperitoneally or intramuscularly, but other routes of administration are also possible.

The disclosed composition, in other certain embodiments, may further include a second active pharmaceutical component selected from at least one of a deuterium-depleted water, ionized water, or ozonated water.

Distilled water ($H_2O$) may be optionally used as a diluent in the claimed composition. The use of other pharmaceutically acceptable solvents and diluents in addition to or instead of distilled water is also acceptable. In certain embodiments, deuterium-depleted water is used as a diluent.

The use of other pharmaceutically acceptable solvents and diluents in addition to the claimed composition is also acceptable.

Large macromolecules that are slowly metabolized, such as proteins, polysaccharides, polylactic acids, polyglycolic acids, polymeric amino acids, copolymers of amino acids, can also be used as carrier compounds for the composition. Pharmaceutically acceptable carriers in therapeutic compositions may additionally contain liquids, such as water, saline, glycerol or ethanol.

The disclosed composition may be presented in various dosage forms depending on the object of application; in particular, it may be formulated as a solution for injections.

The composition may be administered systemically. Suitable routes of administration include, for example, oral or parenteral administration, such as intravenous, intraperitoneal, intragastric as well as via drinking water. However, depending on a dosage form, the disclosed composition may be administered by other routes.

Light isotopes may be purchased.

The disclosed composition can be co-administered with another appropriate agent or therapy.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the appended claims. Thus, while only certain features of the invention have been illustrated and described, many modifications and changes will occur to those skilled in the art. It is therefore to be understood that the appended claims are intended to cover all such modifications and changes as fall within the true spirit of the invention.

What is claimed is:

1. A pharmaceutical composition including a combination of $^{64}Zn$ and $^{85}Rb$ isotopes in the form of sulfate, stearate, or orotate salts, wherein $^{64}Zn$ is enriched to exceed 96% and $^{85}Rb$ is enriched to exceed 90%, wherein said composition further includes deuterium-depleted water ranging from 50 ppm to 150 ppm.

2. A method of suppressing degeneration of biological tissue, including administering a therapeutically effective or prophylactically effective amount of a composition containing a combination of $^{64}Zn$ and $^{85}Rb$ isotopes in the form of sulfate, stearate, or orotate salts, wherein $^{64}Zn$ is enriched to exceed 96% and $^{85}Rb$ is enriched to exceed 90%.

3. The method of claim 2, wherein said composition further includes one or more of deuterium depleted water, ionized water, and ozonated water, wherein the content of deuterium-depleted water ranges from 50 ppm to 150 ppm.

* * * * *